United States Patent
Nakashima et al.

(10) Patent No.: US 10,760,810 B2
(45) Date of Patent: Sep. 1, 2020

(54) EQUIPMENT MANAGEMENT SYSTEM

(71) Applicant: PANASONIC INTELLECTUAL PROPERTY MANAGEMENT CO., LTD., Osaka (JP)

(72) Inventors: Yuusuke Nakashima, Aichi (JP); Masamichi Kachi, Aichi (JP); Tsuraki Nakajima, Aichi (JP); Ayumi Konishi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 8 days.

(21) Appl. No.: 16/087,815

(22) PCT Filed: Mar. 23, 2017

(86) PCT No.: PCT/JP2017/011670
§ 371 (c)(1),
(2) Date: Sep. 24, 2018

(87) PCT Pub. No.: WO2017/179386
PCT Pub. Date: Oct. 19, 2017

(65) Prior Publication Data
US 2019/0086114 A1   Mar. 21, 2019

(30) Foreign Application Priority Data
Apr. 15, 2016   (JP) .................. 2016-081749

(51) Int. Cl.
*F24F 11/56*   (2018.01)
*F24F 11/89*   (2018.01)
(Continued)

(52) U.S. Cl.
CPC .............. *F24F 11/56* (2018.01); *F24F 11/89* (2018.01); *G05B 13/026* (2013.01); *G05B 15/02* (2013.01);
(Continued)

(58) Field of Classification Search
None
See application file for complete search history.

(56) References Cited

U.S. PATENT DOCUMENTS

2013/0073094 A1* 3/2013 Knapton ................ G05B 13/02
                                                          700/278
2014/0277762 A1* 9/2014 Drew .................. G05D 23/1904
                                                          700/276
2017/0241660 A1* 8/2017 Sekar ...................... F24F 11/30

FOREIGN PATENT DOCUMENTS

JP   2008-281279 A   11/2008
JP   2012-251731 A   12/2012
(Continued)

OTHER PUBLICATIONS

International Search Report and Written Opinion issued in International Patent Application No. PCT/JP2017/011670, dated Jun. 6, 2017; with partial English trnaslation.

*Primary Examiner* — Paul B Yanchus, III
(74) *Attorney, Agent, or Firm* — McDermott Will & Emery LLP

(57) ABSTRACT

Equipment management system including two or more indoor environment control devices controlling the air environment in an indoor space; and control terminal connected to each of indoor environment control devices and configured to send and receive information to and from them. Control terminal includes external communication unit that communicates with mobile communication device connected through a public line; condition acquiring unit that acquires information related to an operating condition of
(Continued)

indoor environment control devices from mobile communication device through external communication unit; operating condition determination unit that determines an operating condition of indoor environment control devices based on information acquired by condition acquiring unit; and control unit that operates indoor environment control devices under the operating condition determined by operating condition determination unit.

17 Claims, 11 Drawing Sheets

(51) Int. Cl.
*G05B 15/02* (2006.01)
*G05B 13/02* (2006.01)
*F24F 120/12* (2018.01)
*F24F 11/00* (2018.01)

(52) U.S. Cl.
CPC ... *F24F 11/0001* (2013.01); *F24F 2011/0002* (2013.01); *F24F 2120/12* (2018.01); *G05B 2219/2614* (2013.01)

(56) References Cited

FOREIGN PATENT DOCUMENTS

| | | |
|---|---|---|
| JP | 2014-003391 A | 1/2014 |
| WO | 2013/118885 A1 | 8/2013 |

* cited by examiner

EQUIPMENT MANAGEMENT SYSTEM

CROSS-REFERENCE OF RELATED APPLICATIONS

This application is the U.S. National Phase under 35 U.S.C. § 371 of International Patent Application No. PCT/JP2017/011670, filed on Mar. 23, 2017, which in turn claims the benefit of Japanese Application No. 2016-081749, filed on Apr. 15, 2016, the entire disclosures of which Applications are incorporated by reference herein.

TECHNICAL FIELD

The present disclosure relates to an equipment management system.

BACKGROUND

There have been known management systems that provide a more comfortable indoor environment by introducing outside air.

For example, the following techniques have been developed. That is, a system measures room temperature inside a building and ambient temperature, and when residents of the building come to feel comfortable due to outside air being introduced, the system sends a message that prompts them to open major windows for ventilation, and controls the on/off state of an air-conditioning system that controls the temperature inside the building in response to an open/closed state of the windows (patent literature 1).

CITATION LIST

Patent Literature

PTL 1: Japanese Patent Unexamined Publication No. 2012-251731

SUMMARY

The technique described in patent literature 1 represents control in which persons are assumed to be present in rooms. However, the actual demand is not limited to this case. For example, a system is desired that is capable of adjusting the air environment in a room before a person enters the room.

An objective of the present disclosure is to solve such a problem, namely to provide an equipment management system that conditions the air environment in an indoor space while suppressing energy loss even when no person is present in the room by precisely detecting time when a person on the road returns to their home (e.g., residence).

In order to achieve the above-described objective, one aspect of an equipment management system according to the present disclosure is an equipment management system that includes two or more indoor environment control devices that control the air environment in an indoor space; and a control terminal connected to each of the indoor environment control devices so as to be able to send and receive information to and from them. The control terminal includes an external communication unit able to communicate with a mobile communication device connected to a public line, through the public line; a condition acquiring unit that acquires information related to an operating condition of the indoor environment control device, from the mobile communication device through the external communication unit; an operating condition determination unit that determines an operating condition of the indoor environment control device based on the information acquired by the condition acquiring unit; and a control unit that controls the indoor environment control device under the operating condition determined by the operating condition determination unit.

According to the present disclosure, time when a person (user) on the road returns to their home can be precisely detected, which conditions the air environment in the indoor space while suppressing energy loss even when no person is present in the room.

DESCRIPTION OF EMBODIMENTS

Hereinafter, a description is made of an embodiment of the present disclosure with reference to the related drawings. Note that each of the following embodiments describes one preferable concrete example, and thus they present examples of aspects such as numeric values, shapes, materials, components, positions of components, connection forms of components, and steps (processes) and their sequence, and have no gist of limiting the scope of the disclosure. Hence, a component not described in an independent claim (describing the uppermost concept of the present disclosure) of the components according to the following embodiments is described as an optional component.

In each drawing, a substantially identical component is given the same reference number, and a duplicate description is omitted or simplified.

Exemplary Embodiment

Figure 1:
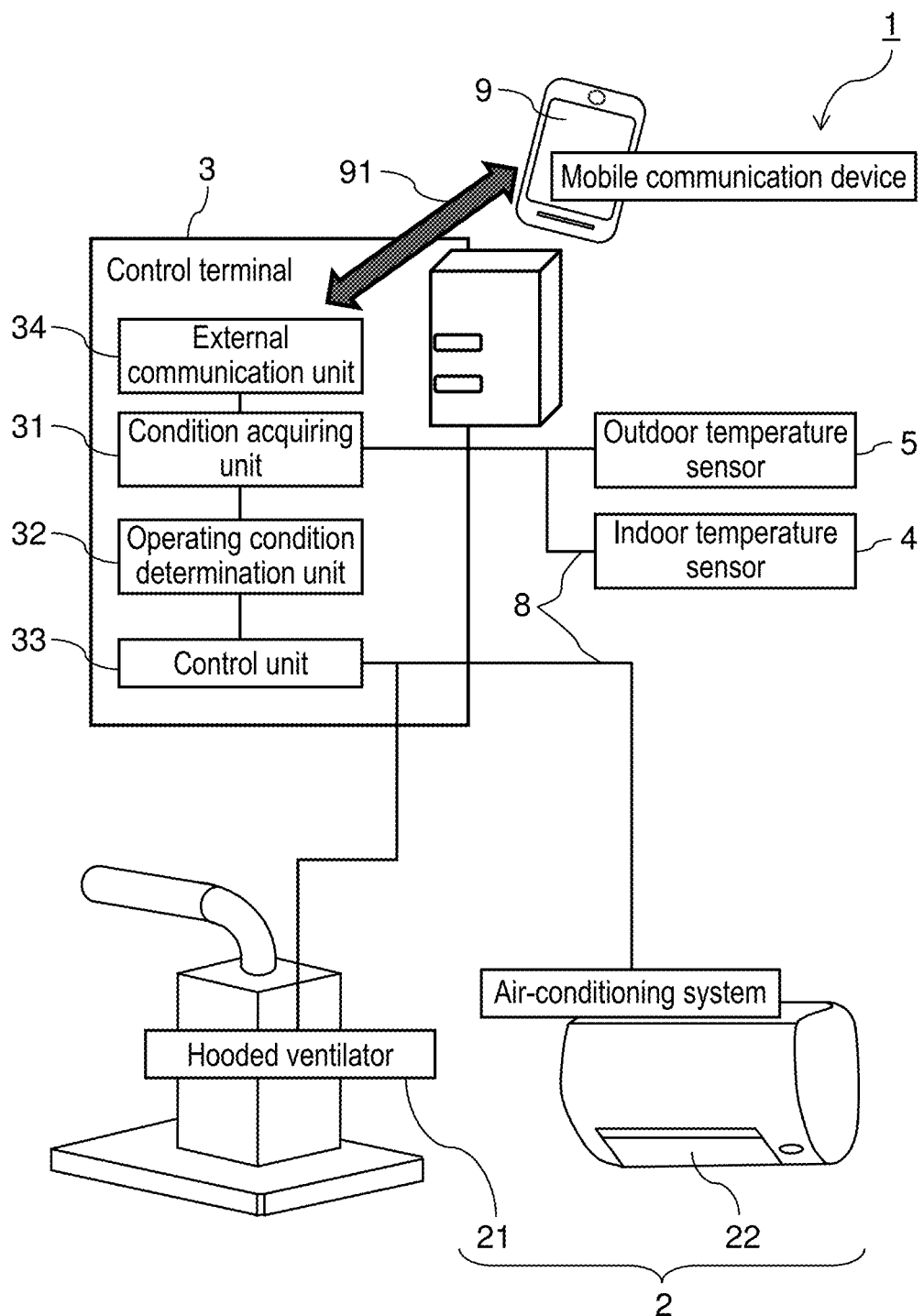
FIG. 1 is a block diagram of an equipment management system according to an embodiment.
Figure 2:
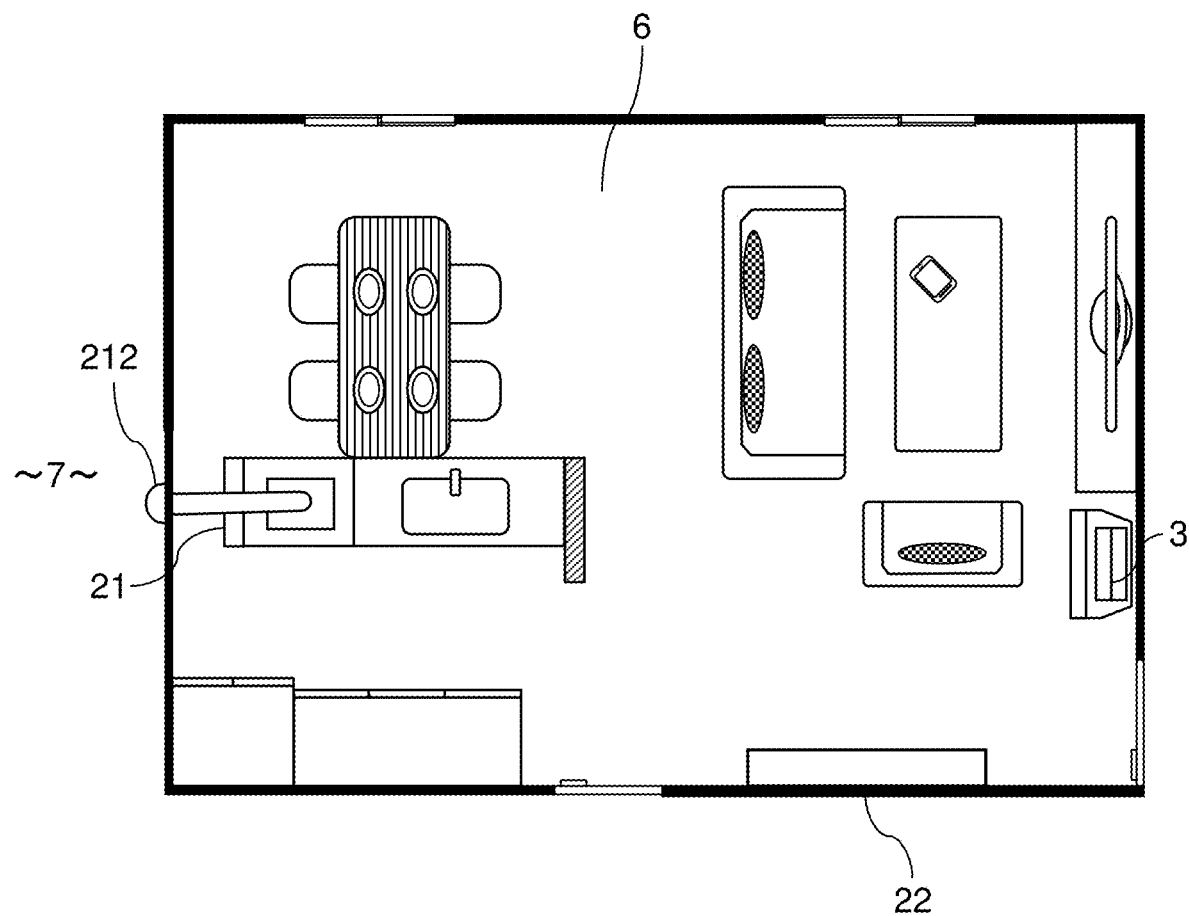
FIG. 2 is a schematic diagram of an example of an indoor space in the embodiment.
Figure 3:
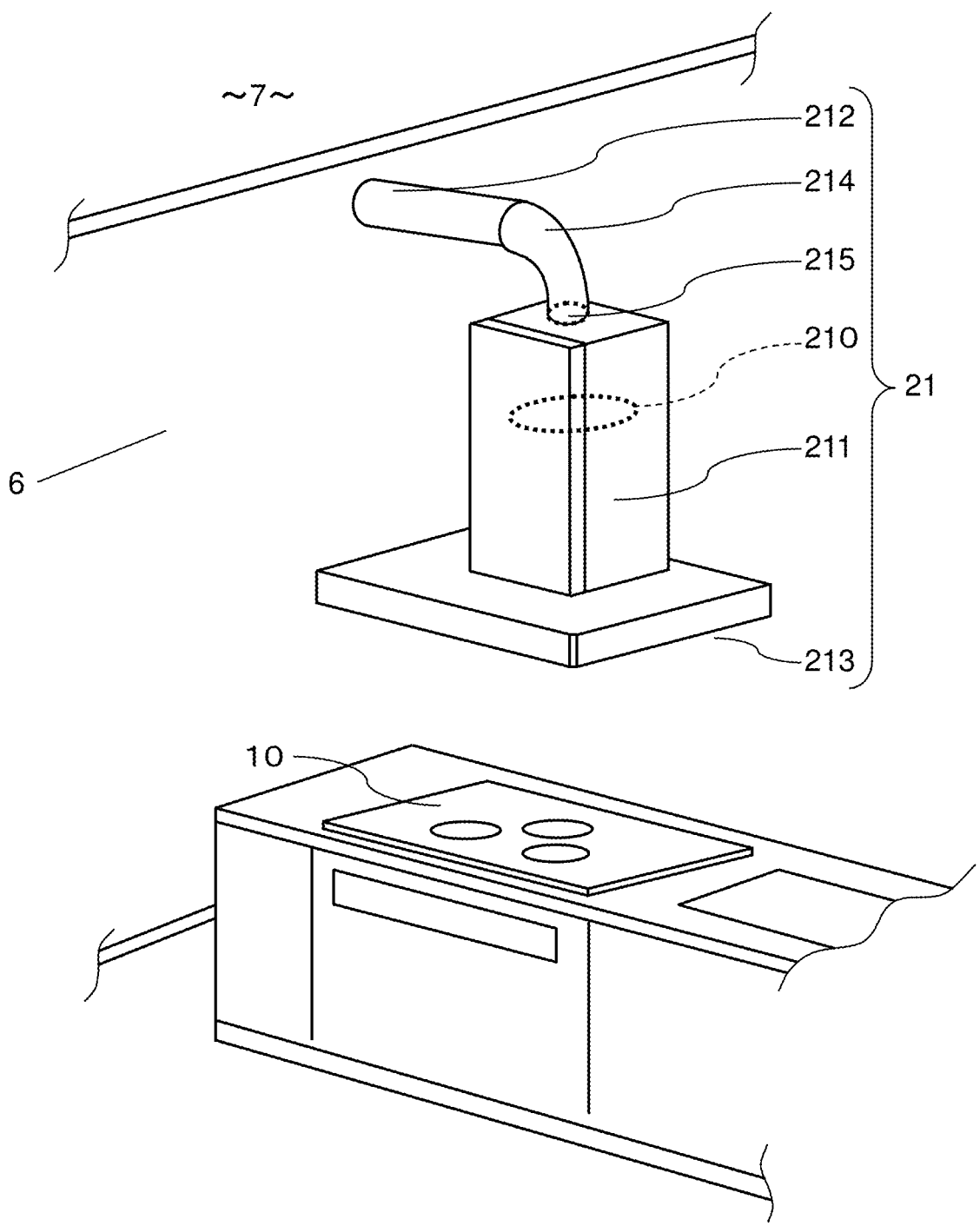
FIG. 3 is a schematic diagram of an example of a hooded ventilator in the embodiment.

First, a description is made of the configuration of equipment management system 1 according to an embodiment of the present disclosure using FIGS. 1 through 3.

Basic Configuration of Equipment Management System

FIG. 1 is a block diagram of an equipment management system according to the embodiment. FIG. 2 is a schematic diagram of an example of an indoor space in the embodiment.

Equipment management system 1 according to this embodiment includes two or more indoor environment control devices 2, control terminal 3, and mobile communication device 9.

Indoor environment control devices 2 control the air environment in indoor space 6. At least one of indoor environment control devices 2 is exemplified as hooded ventilator 21 that conveys air from indoor space 6 to outdoor space 7. Here, indoor space 6 refers to a space enclosed by walls, floors, and roofs, such as a living room, dining room, and single room, which can be rephrased as an interior space. Note that a space equipped with windows and ducts for ventilation in a state able to ventilate is also indoor space 6. Outdoor space 7 refers to a space lacking at least one of a floor, wall, and roof, unlike an indoor space, which can be rephrased as an exterior space.

Control terminal 3 is connected so as to be able to send and receive information with indoor environment control devices 2.

Hereinafter, a description is made of each component of equipment management system 1.

Hooded Ventilator

FIG. 3 is a schematic diagram of an example of a hooded ventilator according to the embodiment. As shown in FIG. 3, hooded ventilator 21 includes exhaust fan 210, hood 211, outdoor air outlet 212, and indoor air inlet 213. Exhaust fan 210 draws air in indoor space 6 and discharges the air into outdoor space 7. Hood 211 covers exhaust fan 210. Outdoor air outlet 212 communicatably connects indoor space 6 with outdoor space 7. Indoor air inlet 213 opens toward the lower part of hood 211 to draw air below hood 211. Exhaust fan 210 is composed of an impeller held by the rotation shaft of a motor for example. Electrifying the motor causes the rotation shaft of the motor to rotate. The rotation of the impeller through the rotation shaft of the motor causes exhaust fan 210 to generate airflow from indoor air inlet 213 to outdoor air outlet 212.

Hood 211 and outdoor air outlet 212 are connected with each other through exhaust tube 214 for example. Here, hood 211 may be connected directly with outdoor air outlet 212.

Hooded ventilator 21 is preferably range hood equipment that draws smoke generated during cooking from indoor air inlet 213 and discharges the smoke through outdoor air outlet 212 into outdoor space 7.

If hooded ventilator 21 is a range hood equipment, indoor air inlet 213 is disposed above stoves provided on cooking base 10 in a kitchen. In such a configuration, hooded ventilator 21 also functions as exhaust equipment used during cooking. As shown in FIG. 2, hooded ventilator 21 as range hood equipment is often placed in a living-dining room (indoor space 6), where residents frequently stay for a long time. Accordingly, hooded ventilator 21 can condition the air environment in indoor space 6 more efficiently for residents. In a multifamily dwelling such as an apartment and condominium, range hood equipment is often installed as an equipped facility at a designed position during construction. Accordingly, equipment management system 1 can easily manage hooded ventilator 21 as range hood equipment.

Exhaust fan 210 of hooded ventilator 21 preferably has an exhaust performance of 200 $m^3$/h or higher. With such a configuration, hooded ventilator 21, having sufficient exhaust performance, can exhaust more air in a short time.

Hooded ventilator 21 can preferably control the volume of blow by setting the amount of exhaust by exhaust fan 210 in a multistep manner. With such a configuration, hooded ventilator 21 can appropriately control the amount of ventilation between indoor space 6 and outdoor space 7.

Hooded ventilator 21 may include exhaust shutter 215 that opens and closes a path that transfers air from indoor space 6 to outdoor space 7. Exhaust shutter 215, by being closed while operation of hooded ventilator 21 is at a stop, can increase the hermeticity of indoor space 6. Exhaust shutter 215 may be installed at the connection part between hood 211 and exhaust tube 214 for example, or at another position.

Air-Conditioning System

At least one of indoor environment control devices 2 may be air-conditioning system 22 that controls the temperature in indoor space 6 by heating or cooling the air inside.

Air-conditioning system 22 heats or cools air for a target temperature in indoor space 6. Air-conditioning system 22 may be a cooling device that only cools the air inside indoor space 6; a heating device that only heats the air inside indoor space 6; or a heating/cooling device that selectively heats or cools the air inside indoor space 6.

Providing air-conditioning system 22 allows indoor environment control device 2 to heat or cool the air inside indoor space 6, thereby controlling temperature in indoor space 6 in a wider range.

Temperature Sensor

Equipment management system 1 may be further equipped with indoor temperature sensor 4 that measures indoor temperature (i.e., temperature inside indoor space 6). Besides, equipment management system 1 may be equipped with outdoor temperature sensor 5 that measures outdoor temperature (i.e., temperature in outdoor space 7). Outdoor temperature refers to ambient temperature.

Indoor temperature sensor 4 and outdoor temperature sensor 5 individually acquire temperature information electrically, and the resulting temperature information is transmitted to condition acquiring unit 31 (details to be described later) of control terminal 3. Indoor temperature sensor 4 and outdoor temperature sensor 5 include an infrared radiation thermometer, thermography, thermistor, platinum temperature measurement resistor, or thermocouple, for example, to measure temperature.

Equipment management system 1, by including indoor temperature sensor 4, compares a target indoor temperature (a target temperature in indoor space 6) with an indoor temperature measured by indoor temperature sensor 4 to control indoor environment control device 2 more efficiently.

Equipment management system 1, by further including outdoor temperature sensor 5, compares a target indoor temperature (a target temperature in indoor space 6) with an indoor temperature measured by indoor temperature sensor 4 to control indoor environment control device 2 more efficiently.

Here, as a substitute for indoor temperature sensor 4, what is included in indoor environment control device 2 can be used, such as hooded ventilator 21 and air-conditioning system 22. Concretely, control terminal 3 acquires temperature information of indoor environment control device 2 through control unit 33 and internal network 8 for example in indoor environment control device 2.

Control Terminal

Control terminal 3 includes condition acquiring unit 31, operating condition determination unit 32, control unit 33, and external communication unit 34. Hereinafter, a description is made of each component of control terminal 3. Control terminal 3 includes a processor, and a memory that stores an instruction. The processor executes the instruction stored in the memory.

Condition acquiring unit 31 acquires information related to an operating condition of indoor environment control device 2. Examples of such information include target indoor temperature, indoor temperature in indoor space 6, outdoor temperature in outdoor space 7, and the number of indoor environment control devices 2 installed and their types. A target indoor temperature here refers to a control-target temperature in indoor space 6 when indoor environment control device 2 is operated. Condition acquiring unit 31 acquires at least one of the information related to an operating condition.

Condition acquiring unit 31 acquires a target indoor temperature in the following manners for example. That is, an input device such as a display panel (unillustrated) provided in control terminal 3 inputs a target indoor temperature to condition acquiring unit 31. Alternatively, a display panel connected to condition acquiring unit 31 through internal network 8 inputs a target indoor temperature to condition acquiring unit 31 for example. Besides, a tablet terminal or mobile-phone terminal connected to condition acquiring unit 31 through a wireless communication line for example inputs a target indoor temperature to condition acquiring unit 31. Here, internal network 8 refers to a network disposed in indoor space 6 and connecting communication terminals under the control of the network. On the other hand, a network connecting communication terminals in outdoor space 7 is referred to as an external network, which is concretely Internet 91 or a public line including Internet 91 for example.

Condition acquiring unit 31 acquires an indoor temperature in indoor space 6 and an outdoor temperature in outdoor space 7 in the following manner for example. That is, indoor temperature sensor 4 and outdoor temperature sensor 5 connected to condition acquiring unit 31 through internal network 8 acquire temperature information as output information.

Condition acquiring unit 31 acquires the number of indoor environment control devices 2 installed and their types in the manners similar to those for a target indoor temperature described above.

Operating condition determination unit 32 determines an operating condition of each of indoor environment control devices 2 based on the information related to an operating condition acquired by condition acquiring unit 31. An operating condition is determined by the following manner for example. That is, control terminal 3 first predicts home-return time of a user by the process described later. Next, control terminal 3 operates hooded ventilator 21 according to the home-return time predicted to condition the indoor air environment while suppressing energy loss through the use of outside air. If the target indoor temperature cannot be achieved using outside air alone, control terminal 3 uses air-conditioning system 22 to condition the indoor air environment. In such a process, a higher accuracy in predicting home-return time of the user reduces more energy loss. For an operating condition, a variety of processes can be made; however, an object of this application is to increase the accuracy in predicting home-return time of a user, and thus details are omitted.

Control unit 33 operates indoor environment control device 2 under the operating condition determined by operating condition determination unit 32. Control unit 33 is connected to indoor environment control devices 2 through internal network 8 so as to be able to send and receive information. Control unit 33 communicates with indoor environment control devices 2 through internal network 8 to control them.

Internal network 8 connecting control terminal 3 with indoor environment control device 2 may use wireless communications by Digital Enhanced Cordless Telecommunications (referred to as DECT hereinafter) for example. Wireless communications using DECT are not affected by electromagnetic noise, which allows wireless connection near an appliance (e.g., microwave oven, electromagnetic cooker) that generates electromagnetic noise. Besides, DECT allows stable connection even in an environment (e.g., a stand-alone house) that requires wireless connection through a long-distance internal network.

Mobile Communication Device and External Communication Unit

Mobile communication device 9 is a communication device that is movable in at least outdoor space 7 and can send and receive information through an external network (i.e., Internet 91) in a destination area. Concretely, examples of mobile communication device 9 include a mobile phone, car navigation system, and GPS (global positioning system) transmitter. A GPS transmitter refers to a device that specifies its current location by receiving signals from GPS satellites and transmits the result to another terminal through an external network, which may be used for specifying the location of a child or a car.

Mobile communication device 9 is connectable to Internet 91 through wireless communications for example. Mobile communication device 9 also has a positional information acquiring function that acquires positional information at the time point (i.e., current location information) about mobile communication device 9 by the GPS function or by acquiring information about a base station used for wireless communications.

External communication unit 34, connected to Internet 91, communicates with mobile communication device 9 connected to Internet 91 through Internet 91. External communication unit 34 transmits information related to an operating condition and current location information of indoor environment control device 2, of information obtained from mobile communication device 9 through communications with mobile communication device 9, to condition acquiring unit 31.

Detecting Positional Information and Determining Operation of Indoor Environment Control Device Hereinafter, a description is made of detecting positional information of control terminal 3 and mobile communication device 9 for increasing the accuracy in predicting home-return time of a user, and of determining operation of indoor environment control device 2.

Positional Information of Control Terminal

Condition acquiring unit 31 has positional information of control terminal 3 stored in addition to an operating condition of indoor environment control device 2 described above. Positional information of control terminal 3 can be input through an external input terminal or a display panel when control terminal 3 is installed for example. Alternatively, control terminal 3, having a positional information acquiring function similar to that of mobile communication device 9, may acquire positional information by the function. Examples of positional information include the latitude and longitude of the current location of control terminal 3, positional information (e.g., code) representing a specific location, and the address or postal code of a building where control terminal 3 is placed.

Figure 4:
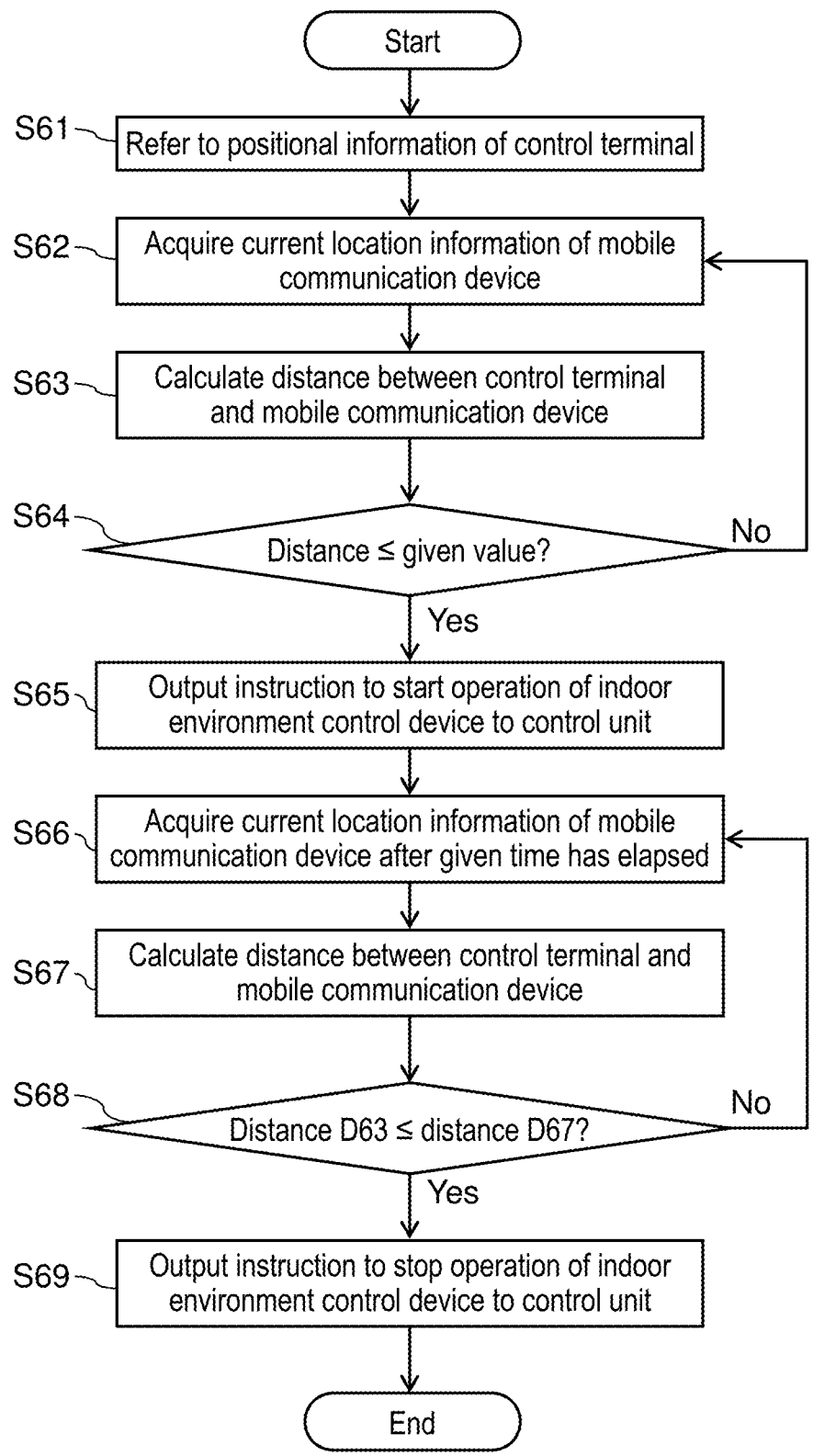
FIG. 4 is a flowchart illustrating an example of operation of an operating condition determination unit according to the embodiment.

An Example of Determining an Operating Condition by Control Terminal using Positional Information of Mobile Communication Device Next, a description is made of an example of determining an operating condition by control terminal 3 (operating condition determination unit 32) using positional information of mobile communication device 9 in the embodiment using FIG. 4. FIG. 4 is a flowchart illustrating an example of operation of the operating condition determination unit according to the embodiment.

Operating condition determination unit 32 refers to positional information of control terminal 3 stored in condition acquiring unit 31 (step S61). Next, operating condition determination unit 32 acquires current location information of mobile communication device 9 acquired by external communication unit 34 through condition acquiring unit 31 (step S62).

Operating condition determination unit 32 calculates a distance between control terminal 3 and mobile communication device 9 based on positional information of control terminal 3 and current location information of mobile communication device 9 (step S63). Next, operating condition determination unit 32 determines whether the distance between control terminal 3 and mobile communication device 9 is equal to or smaller than a given distance (step S64). Here, a given distance is a fixed numeric value set in advance in control terminal 3 (e.g., condition acquiring unit 31) through a display panel for example, concretely 10 km for example).

Operating condition determination unit 32, if the distance between control terminal 3 and mobile communication device 9 is equal to or smaller than a given distance (Yes in step S64), outputs an instruction to start operation of indoor environment control device 2, to control unit 33 (step S65). If the distance between control terminal 3 and mobile communication device 9 is larger than the given distance (No in step S64), the process flow returns to step S62 after a given time has elapsed.

Here, home-return time is defined as time required for a user carrying mobile communication device 9 to travel a given distance to straightly return to indoor space 6 where control terminal 3 is placed. Air environment adjusting time is defined as time required for indoor environment control device 2 to condition an air environment in indoor space 6. If air environment adjusting time is longer than home-return time, the air environment in indoor space 6 cannot be conditioned by the time when the user returns home. Air environment adjusting time varies depending on a means of transportation of the user, an air environment in indoor space 6 requested by the user, or the performance of each indoor environment control device 2, for example. Hence, the given distance is configured to be changed appropriately through a display panel for example by the user. Resultingly, the given distance can be set longer as required to extend the measurable range of home-return time, thereby providing an air environment requested by the user.

With such a configuration, home-return time does not need to be set in advance using a timer for example, and indoor environment control device 2 can be activated if a person (user) is supposed to soon return home. Here, examples of operation of indoor environment control device 2 include turning on hooded ventilator 21, but may be otherwise.

Figure 5:
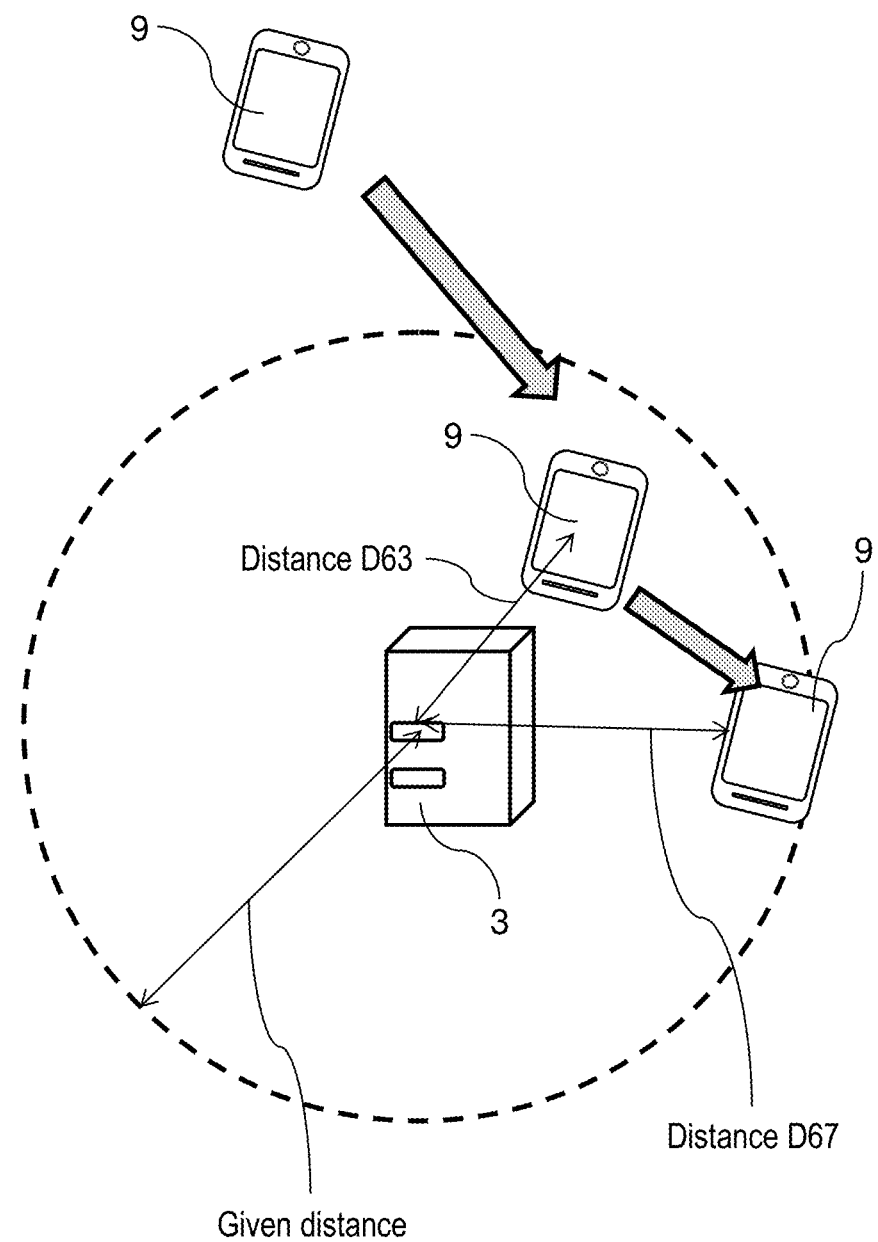
FIG. 5 is a schematic diagram illustrating a positional relationship between a control terminal and an external communication device according to the embodiment.

Next, after a given time has elapsed after step S65 completed, operating condition determination unit 32 acquires current location information of mobile communication device 9 through external communication unit 34 (step S66). Operating condition determination unit 32 calculates a distance between control terminal 3 and mobile communication device 9 based on positional information of control terminal 3 referred to in step S61 and current location information of mobile communication device 9 acquired in step S66 (step S67). Operating condition determination unit 32 compares distance D63 (the distance between control terminal 3 and mobile communication device 9 calculated in step S63); with distance D67 (the distance between control terminal 3 and mobile communication device 9 calculated in step S67) (step S68). FIG. 5 is a schematic diagram illustrating a positional relationship between the control terminal and the external communication device according to the embodiment. As shown in FIG. 5, if distance D67 is longer than distance D63, mobile communication device 9 is determined to be away from control terminal 3. If distance D67 remains constant relative to distance D63, mobile communication device 9 is determined to be at a stop. If distance D63 <distance D67 (Yes in step S68), operating condition determination unit 32 outputs an instruction to stop indoor environment control device 2 in operation, to control unit 33 (step S69). If distance D63>distance D67 (No in step S68), operating condition determination unit 32 outputs an instruction to return to step S66.

With such a configuration, if a user carrying mobile communication device 9 becomes unlike to immediately return to indoor space 6, indoor environment control device 2 can be stopped. This reduces unnecessary operating time of indoor environment control device 2. Here, operating condition determination unit 32 can operate indoor environment control device 2 again even after indoor environment control device 2 is once stopped. For example, operating condition determination unit 32 starts the process flow again from step S61 after a given time has elapsed after step S69 completed. Resultingly, operating condition determination unit 32 calculates a distance between control terminal 3 and mobile communication device 9, and if determining that mobile communication device 9 is approaching control terminal 3 again, can operate indoor environment control device 2 again.

Furthermore, setting the given distance shorter prevents an instruction to start operation of indoor environment control device 2 from being unnecessarily output.

Besides, condition acquiring unit 31 may be configured to be able to change the given distance set in advance based on the difference between a target indoor temperature and a temperature in outdoor space 7 acquired. For a large difference (e.g., 5° C. or higher), the given distance set in advance is increased. For a small difference (e.g., lower than 5° C.), the given distance set in advance is decreased. To sum up, the given distance set in advance is dynamically increased or decreased in response to the difference between a target indoor temperature and a temperature in outdoor space 7. Herewith, for a large difference in temperature for example, time of a user returning to indoor space 6 can be known at an early stage by extending the given distance, which provides adequate time for conditioning the environment in the indoor space. This allows time for combining different types of indoor environment control devices 2, thereby conditioning the air environment in indoor space 6 while suppressing energy loss.

Figure 6:
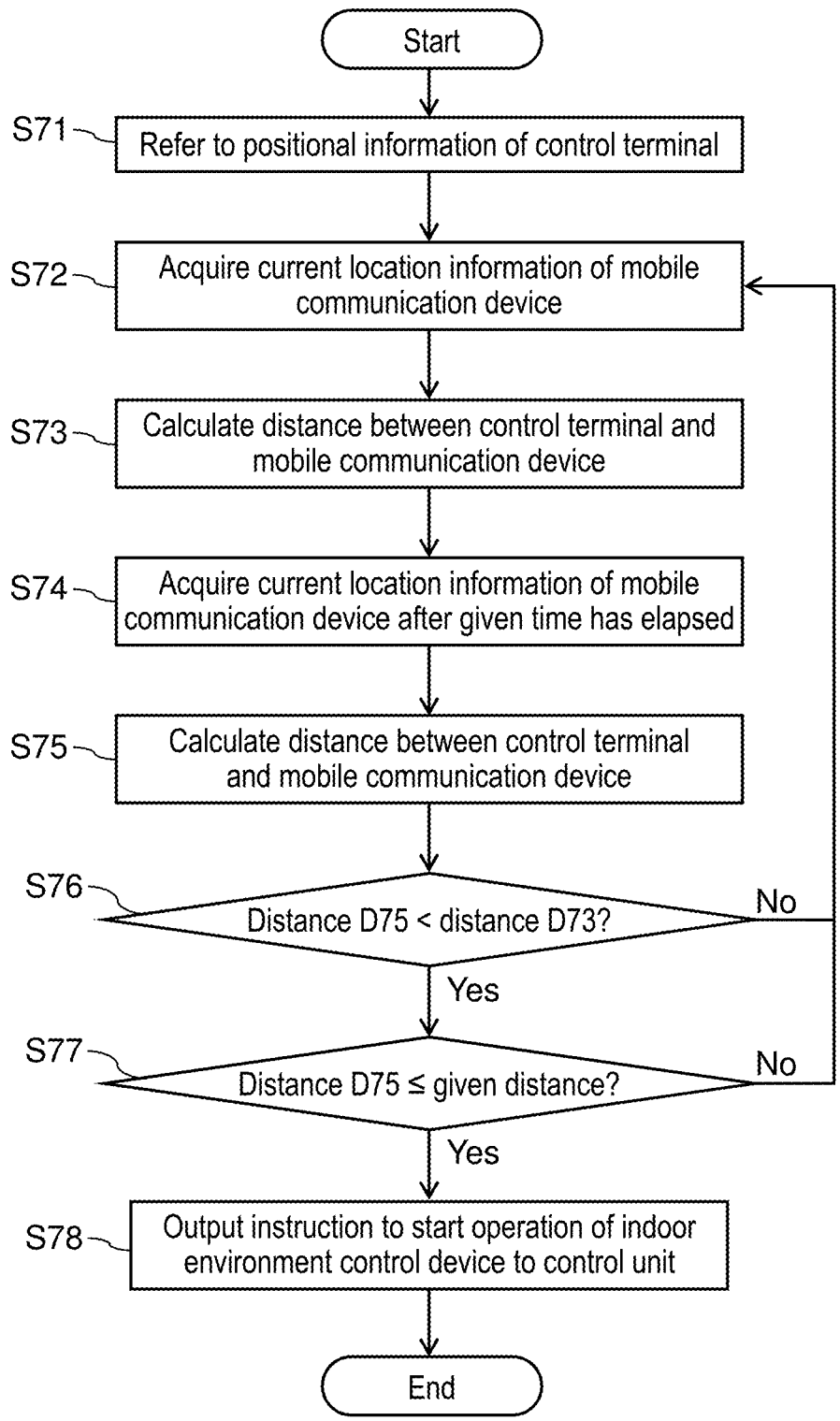
FIG. 6 is a flowchart illustrating another example of operation of the operating condition determination unit according to the embodiment.
Figure 7:
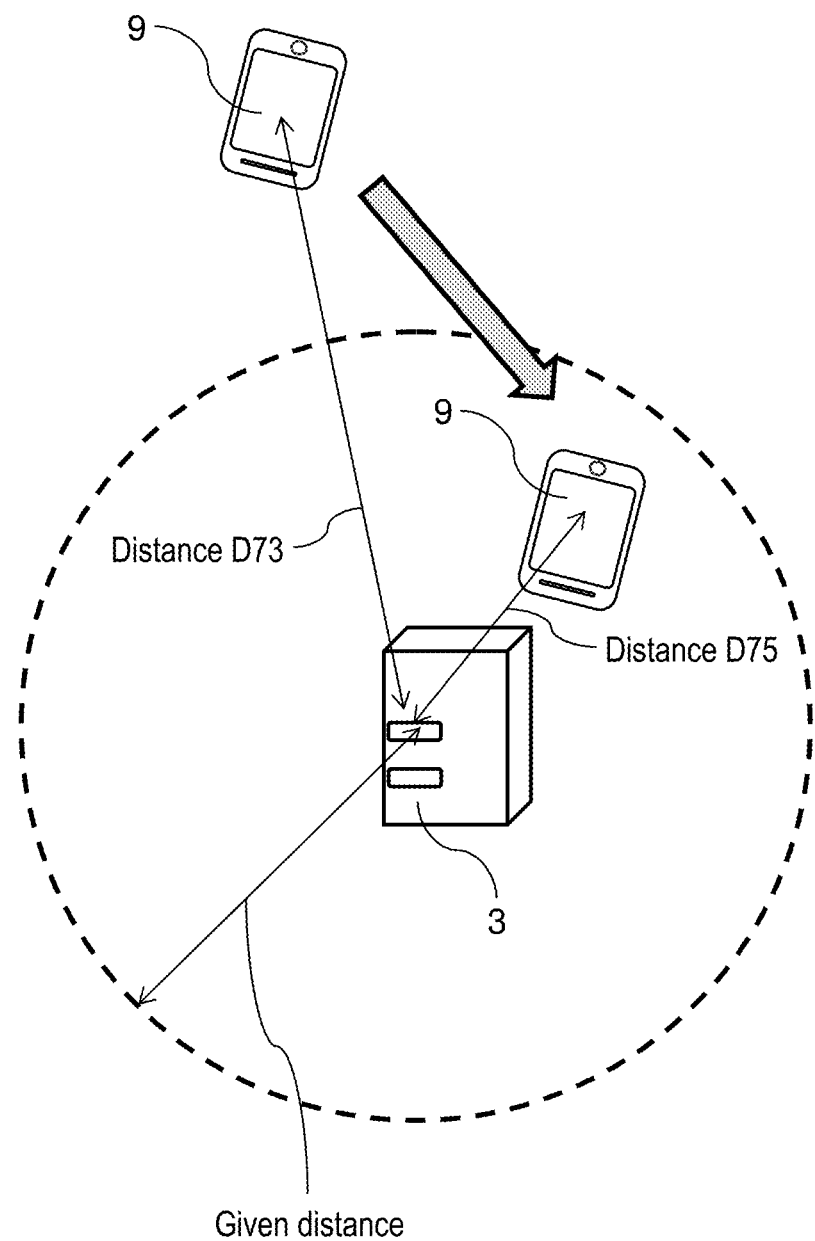
FIG. 7 is a schematic diagram illustrating a positional relationship between the control terminal and the external communication device according to the embodiment.

Another Example of Determining Start of Operation by Control Terminal using Positional Information of Mobile Communication Device Next, a description is made of another example of determining start of operation by control terminal 3 using positional information of mobile communication device 9 using FIGS. 6 and 7. FIG. 6 is a flowchart illustrating another example of operation of the operating condition determination unit according to the embodiment. FIG. 7 is a schematic diagram illustrating a positional relationship between the control terminal and the external communication device according to the embodiment. Control terminal 3 of an example described before measures the distance between control terminal 3 and mobile communication device 9 again after indoor environment control device 2 is operated in response to the distance between control terminal 3 and mobile communication device 9. Meanwhile, control terminal 3 of another example described below measures the distance between control terminal 3 and mobile communication device 9 twice before indoor environment control device 2 is operated. Hereinafter, details are described.

Operating condition determination unit 32 refers to positional information of control terminal 3 stored in condition acquiring unit 31 (step S71). Next, operating condition determination unit 32 acquires current location information of mobile communication device 9 acquired by external communication unit 34, through condition acquiring unit 31 (step S72).

Operating condition determination unit 32 calculates a distance between control terminal 3 and mobile communication device 9 based on positional information of control terminal 3 and current location information of mobile communication device 9 (step S73). Next, operating condition determination unit 32 acquires current location information of mobile communication device 9, through external communication unit 34 after a given time has elapsed after step S73 completed (step 74). Operating condition determination unit 32 calculates a distance between control terminal 3 and mobile communication device 9 based on positional information of control terminal 3 referred to in step S71 and positional information of mobile communication device 9 acquired in step S74 (step S75). Operating condition determination unit 32 compares distance D73 (the distance between control terminal 3 and mobile communication device 9 calculated in step S73); with distance D75 (the distance between control unit 3 and mobile communication device 9 calculated in step S75) (step S76). Here, if distance D75<distance D73 (Yes in step S76), the process proceeds to step S77; otherwise (No in step S76), returns to step S72.

Next, operating condition determination unit 32 determines whether distance D75 is equal to or smaller than a given value in step S77 (step S77). If equal to or smaller (Yes in step S77), operating condition determination unit 32 determines that the distance between control terminal 3 and mobile communication device 9 has become equal to or smaller than the given distance and at the same time mobile communication device 9 is approaching control terminal 3 as shown in FIG. 7. Then, operating condition determination unit 32 operates indoor environment control device 2 through control unit 33 (step S78). If distance D75 is larger than the given value (No in step S77), the process flow returns to step S72.

Such a configuration eliminates the need for setting home-return time with a timer for example in advance, and indoor environment control device 2 can be activated if the user is supposed to soon return home. Additionally in this embodiment, start of operation is also determined by a moving direction of mobile communication device 9 relative to control terminal 3. This allows the possibility of a user returning home carrying mobile communication device 9 to be detected more accurately, suppressing energy loss of indoor environment control device 2, which provides efficient equipment management.

Figure 8:
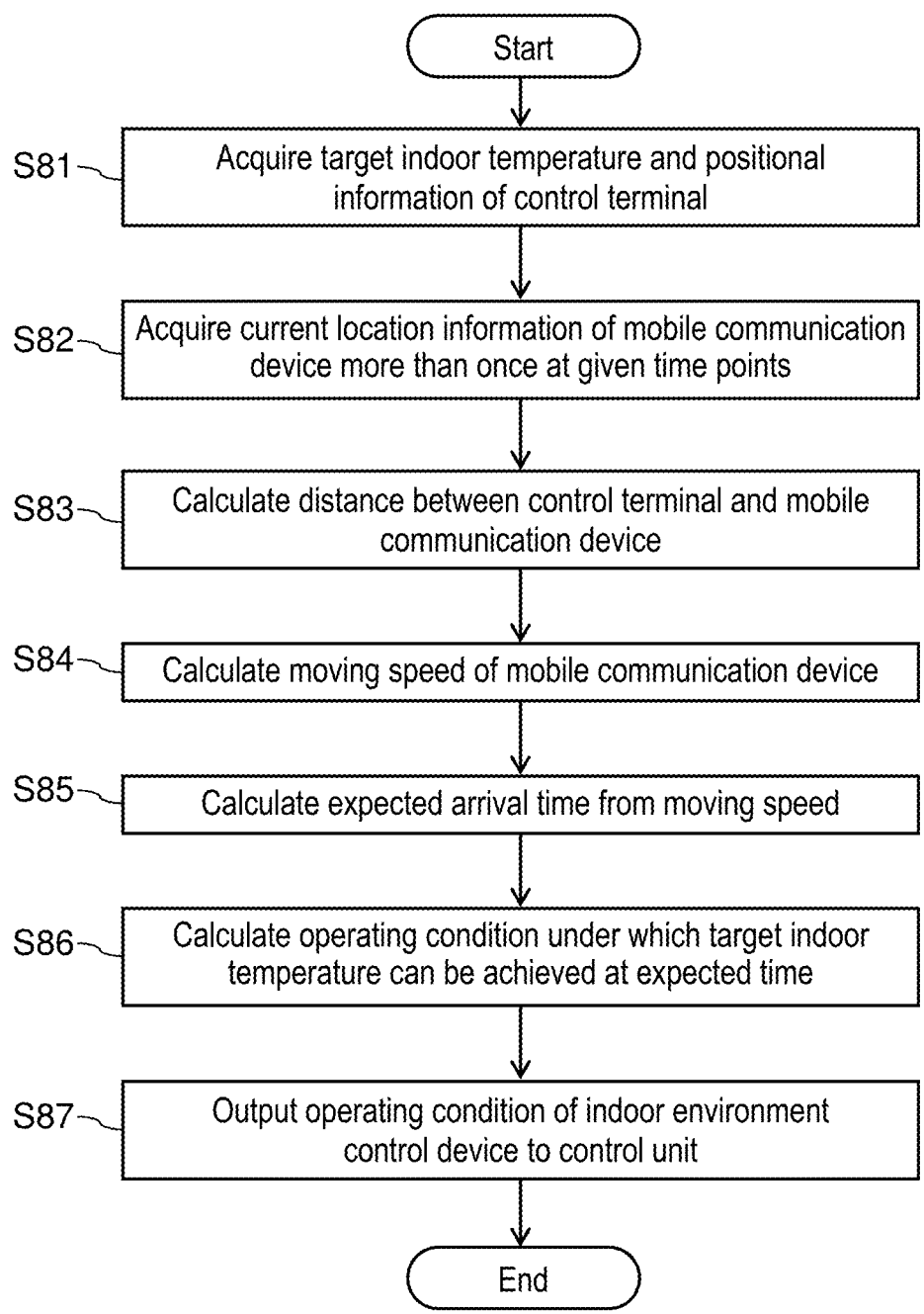
FIG. 8 is a flowchart illustrating an example of operation of the operating condition determination unit according to the embodiment.

An Example of Determining Time of Starting Operation by Control Terminal using Positional Information of Mobile Communication Device Next, a description is made of an example of determining time of starting operation by control terminal 3 using positional information of mobile communication device 9 using FIG. 8. FIG. 8 is a flowchart illustrating an example of operation of the operating condition determination unit according to the embodiment. Control terminal 3 calculates a moving speed of mobile communication device 9 to predict arrival time of a user. Hereinafter, details are described.

Operating condition determination unit 32 acquires target indoor temperature stored in condition acquiring unit 31 and positional information of control terminal 3 (step S81). Next, condition determination unit 32 acquires time information and location information items from mobile communication device 9 through condition acquiring unit 31 more than once at different time points (step S82).

Operating condition determination unit 32 calculates a distance between control terminal 3 and mobile communication device 9 based on positional information of control terminal 3 and current location information of mobile communication device 9 (step S83). Operating condition determination unit 32 calculates a moving speed of mobile communication device 9 based on time information and location information items of mobile communication device 9 acquired more than once in step S82 (step S84). Operating condition determination unit 32 calculates backward expected arrival time when mobile communication device 9 arrives at the location of control terminal 3 based on the moving speed calculated in step S84 and the distance calculated in step S83 (step S85). Operating condition determination unit 32 sets the expected arrival time calculated in step S85 as room temperature achieving time when target indoor temperature should be achieved and determines an on time when indoor environment control device 2 is activated based on the room temperature achieving time. At this moment, which devices (e.g., only hooded ventilator 21, only air-conditioning system 22) of indoor environment control devices 2 are activated can be determined (step S86). Operating condition determination unit 32 outputs an operating condition (including the on time determined in step S86) of indoor environment control device 2, to control unit 33 (step S87).

Figure 9:
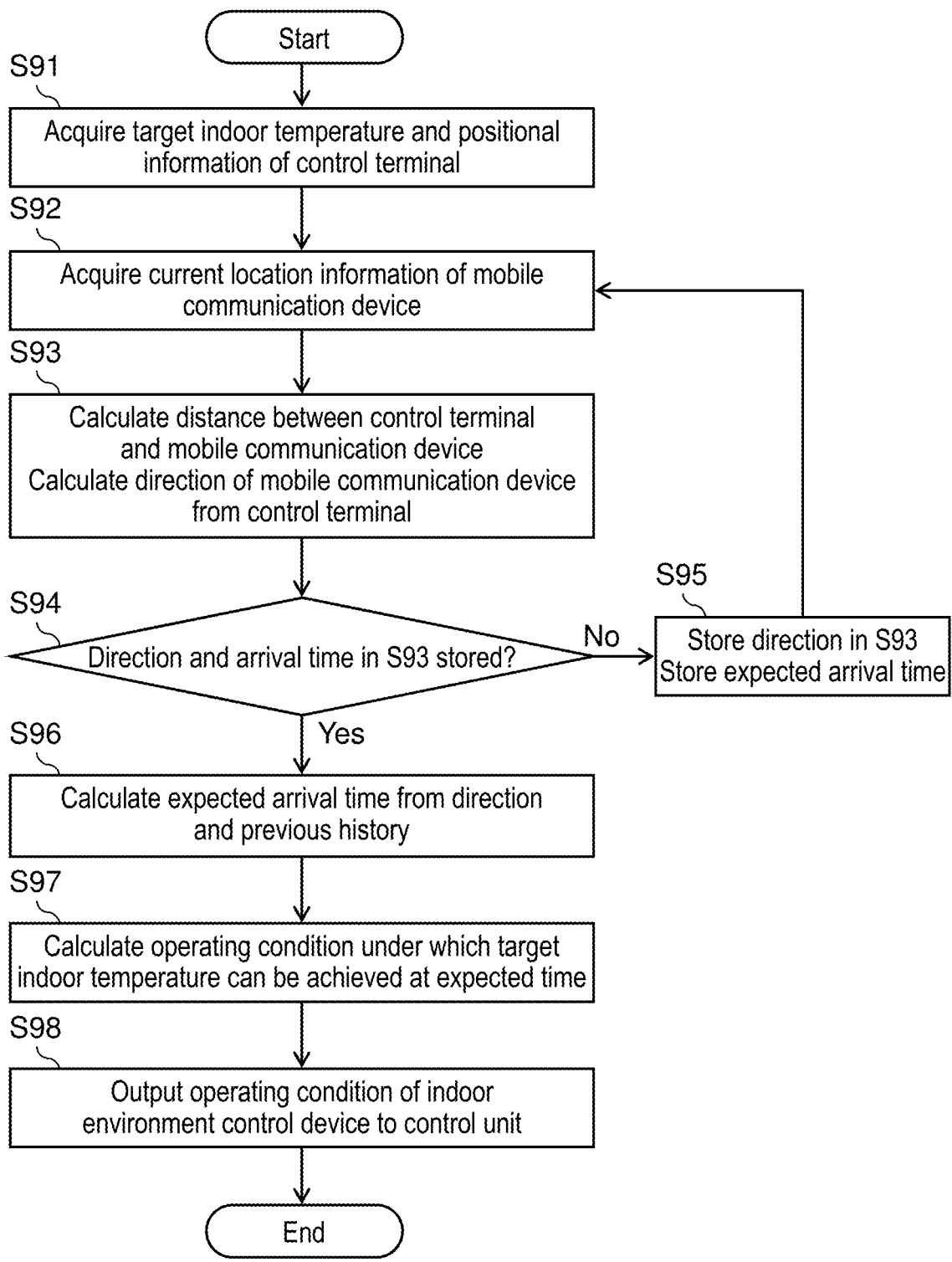
FIG. 9 is a flowchart illustrating another example of operation of the operating condition determination unit according to the embodiment.
Figure 10:
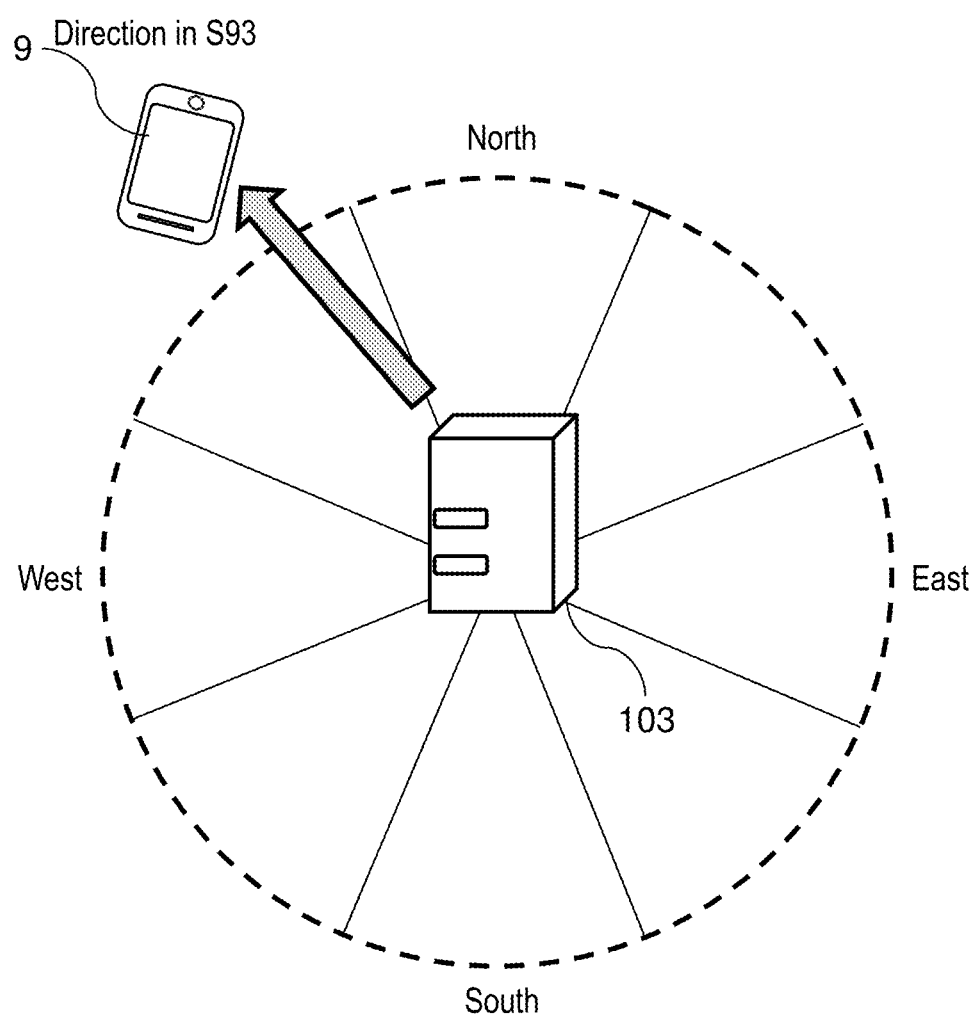
FIG. 10 is a schematic diagram illustrating a positional relationship between the control terminal and a mobile communication device according to the embodiment.
Figure 11:
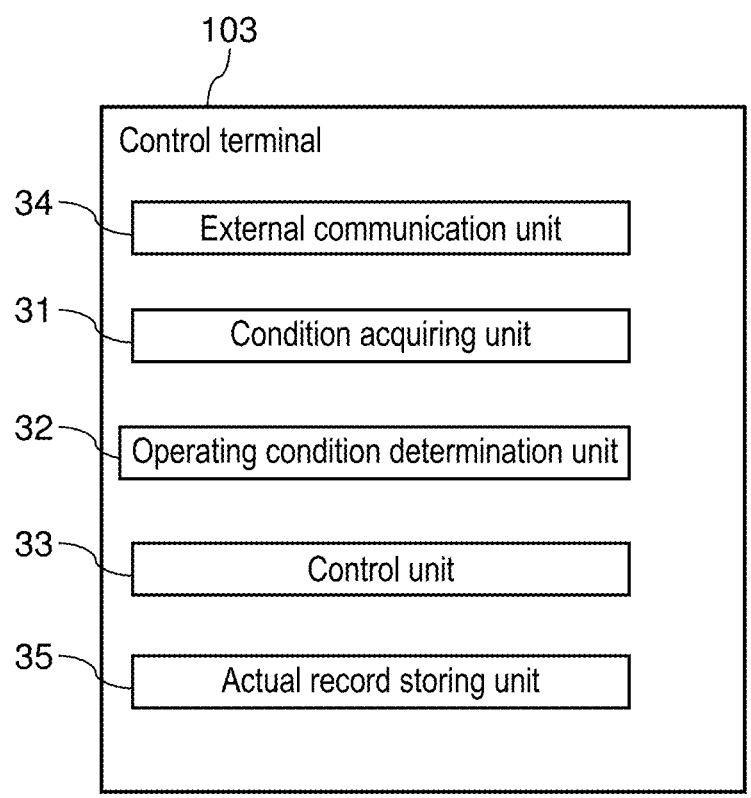
FIG. 11 is a block diagram of the control terminal according to the embodiment.

Such a configuration allows control terminal 3 to precisely predict time when a user carrying mobile communication device 9 returns to indoor space 6 by calculating moving speed of mobile communication device 9. Control terminal 3 determines an operating condition of indoor environment control device 2 based on the room temperature achieving time, which is the time point when the user returns to indoor space 6. Accordingly, control terminal 3 can achieve a required indoor environment under the operating condition with the lowest energy loss. Another example of determining operation start time by control terminal using positional information of mobile communication device Next, a description is made of another example of determining operation start time by control terminal 103 using positional information of mobile communication device 9 using FIGS. 9, 10, and 11. FIG. 9 is a flowchart illustrating another example of operation of the operating condition determination unit according to the embodiment. FIG. 10 is a schematic diagram illustrating a positional relationship between the control terminal and the mobile communication device according to the embodiment. FIG. 11 is a block diagram of the control terminal according to the embodiment. Control terminal 103 of another example described below has, besides the functions described above, a function of calculating expected time when mobile communication device 9 arrives at the location of control terminal 103, from the previous time history. Hereinafter, details are described.

Operating condition determination unit 32 acquires target indoor temperature stored in condition acquiring unit 31 and positional information of control terminal 103 (step S91). Next, operating condition determination unit 32 acquires current location information from mobile communication device 9 through condition acquiring unit 31 (step S92).

Operating condition determination unit 32 calculates a distance between control terminal 103 and mobile communication device 9 based on positional information of control terminal 103 and current location information of mobile communication device 9. Besides, operating condition determination unit 32 calculates a direction of mobile communication device 9 from control terminal 103 based on positional information of control terminal 103 and current location information of mobile communication device 9 (step S93).

Here, a direction of mobile communication device 9 from control terminal 103 is classified into eight areas: east, west, south, north, northeast, northwest, southeast, and southwest centering on control terminal 103 for example as shown in FIG. 10.

First, operating condition determination unit 32 determines whether or not time for mobile communication device 9 to travel to arrive at the location of control terminal 103 from the above direction has been stored once or more in the past, based on the direction and the distance calculated in step S93 (step S94). The determination is made as follows.

As shown in FIG. 11, control terminal 103 includes actual record storing unit 35. Actual record storing unit 35 associates an area, a distance between control terminal 103 and mobile communication device 9 in the area, and time for mobile communication device 9 to travel to arrive at the location of control terminal 103 from the distance in the area, with one another, and stores them as a previous actual record. Then, operating condition determination unit 32 searches for data that matches a previous identical condition in actual record storing unit 35. If no matching data is found, determination is made that there is not an actual record indicating that mobile communication device 9 has arrived at the location of control terminal 103 from the relevant area. If matching data has been found, the time in the data can be used as a time history (described later).

If mobile communication device 9 has never arrived at the location of control terminal 103 from the direction of mobile communication device 9 calculated in step S93 (No in step S94), mobile communication device 9 moves to the location of control terminal 103, and control terminal 103 stores the direction calculated and time for mobile communication device 9 to travel to arrive at control terminal 103 from the direction calculated, and the process flow returns to step S92 (step S95).

If mobile communication device 9 has arrived at the location of control terminal 103 from the relevant direction of mobile communication device 9 from control terminal 103 once or more in the past, and time for mobile communication device 9 to travel to arrive at control terminal 103 is stored (Yes in step S94), the process flow proceeds to step S96. In step S96, expected time is calculated at which mobile communication device 9 arrives at the location of control terminal 103 based on a time history that indicates time for mobile communication device 9 to travel to arrive at the location of control terminal 103 in the previous direction stored (step S96). Expected time is calculated using the latest time history for example, or an average of two or more time histories.

Then, operating condition determination unit 32 sets the expected time calculated in step S96 as a room temperature achieving time at which the target indoor temperature should be achieved, and determines an on time at which indoor environment control device 2 is activated based on the room temperature achieving time.

At this moment, which devices (e.g., only hooded ventilator 21, only air-conditioning system 22) of indoor environment control devices 2 are activated can be determined (step S97).

Operating condition determination unit 32 outputs an operating condition of indoor environment control device 2 including the on time determined in step S97, to control unit 33 (step S98). Here, time for mobile communication device 9 to travel to arrive at the location of control terminal 103 may be stored on an as-needed basis. As a result that expected time when mobile communication device 9 will arrive at the location of control terminal 103 is predicted from previous two or more time histories, the expected time becomes more accurate.

Such a configuration allows time for a user carrying mobile communication device 9 to travel to return to indoor space 6 to be predicted more precisely.

Hereinbefore, the description is made of equipment management system 1; however, the present disclosure is not limited to the embodiment described above. The scope of the disclosure includes any embodiments achieved from various types of modifications that could be devised from the embodiment by those skilled in the art within a scope that does not deviate from the gist of the disclosure. Hereinafter, various types of modified examples are described.

MODIFIED EXAMPLES

An Example of Determining Operating Condition by Mobile Communication Device using positional Information In this embodiment, operating condition determination unit 32 calculates positional information stored in condition acquiring unit 31, but other operation may be used.

For example, in a case where mobile communication device 9 determines an operating condition using positional information of mobile communication device 9, an example is described again using FIG. 4.

Mobile communication device 9 refers to positional information of control terminal 3 stored in condition acquiring unit 31 (step S61). Regarding steps S62 through S69, the processes described under "An example of determining operating condition by control terminal using positional information of mobile communication device" are performed by mobile communication device 9 instead of operating condition determination unit 32, which is the only difference, and the others are the same. In steps S62 and S66, mobile communication device 9 acquires its current location information by its own positional information acquiring function.

With such a configuration, a distance between control terminal 3 and mobile communication device 9 can be calculated continuously even if mobile communication device 9 cannot be connected with control terminal 3. In other words, if mobile communication device 9 is unconnectable with control terminal 3, the calculation process is continued inside mobile communication device 9, and when becoming connectable with control terminal 3, mobile communication device 9 collectively transmits the information calculated to control terminal 3. This allows accurate information to be acquired later even in a state unable to communicate temporarily, and thus control can be performed without the need of continuous communications.

Another Example of Determining an Operating Condition by Mobile Communication Device using Positional Information of Mobile Communication Device In a case where mobile communication device 9 determines an operating condition using positional information of mobile communication device 9, another example is described again using FIG. 6.

Mobile communication device 9 refers to positional information of control terminal 3 stored in condition acquiring unit 31 (step S71). Regarding steps S72 through S78, the processes described under "An example of determining an operating condition by control terminal using positional information of mobile communication device" are performed by mobile communication device 9 instead of operating condition determination unit 32, which is the only difference, and the others are the same. In steps S72 and S74, mobile communication device 9 acquires its current location information by its own positional information acquiring function.

With such a configuration, a distance between control terminal 3 and mobile communication device 9 can be calculated continuously even if mobile communication device 9 cannot be connected with control terminal 3, which provides the advantage described above.

As shown in the above, an equipment management system according to the present disclosure can precisely predict home-return time of a user and can control an indoor environment control device under an operating condition with a high thermal efficiency (low energy loss), although some time is required for example, to condition the indoor environment.

Others

Hereinbefore, the description is made of the signal processing device according to the present disclosure based on the embodiment and its modified example, but the present disclosure is not limited to them.

Besides, the scope of the disclosure includes any embodiments achieved from various types of modifications that could be devised from each embodiment and each modified example by those skilled in the art; and any embodiments achieved by combining any components and any functions in each embodiment and each modified example within a scope that does not deviate from the gist of the disclosure.

Examples of operation of indoor environment control device 2 include operation in which hooded ventilator 21 is made into an on state. By combining different indoor environment control devices 2, an air environment can be conditioned before the home-return time of a user predicted.

INDUSTRIAL APPLICABILITY

The present disclosure precisely detects time when a person on the road returns to their home, and thus is useful as an equipment management system that conditions the air environment in an indoor space while suppressing energy loss even when no person is present in a room.

REFERENCE MARKS IN THE DRAWINGS 1 equipment management system
2 indoor environment control device
21 hooded ventilator
211 hood
212 outdoor air outlet
213 indoor air inlet
215 exhaust shutter
22 air-conditioning system
3, 103 control terminal
31 condition acquiring unit
32 operating condition determination unit
33 control unit
34 external communication unit
35 actual record storing unit
4 indoor temperature sensor
5 outdoor temperature sensor
6 indoor space
7 outdoor space
9 mobile communication device
91 Internet

The invention claimed is:

1. An equipment management system comprising:
a plurality of indoor environment control devices for controlling an air environment in an indoor space; and
a control terminal connected to each of the plurality of indoor environment control devices and configured to send and receive information to and from each of the plurality of indoor environment control devices,
wherein the control terminal includes:
an external communication unit configured to communicate, via a public line with a mobile communication device;
a condition acquiring unit configured to acquire information related to an operating condition for each of the plurality of indoor environment control devices from the mobile communication device;
a operating condition determination unit configured to determine the operating condition of the each of the plurality of indoor environment control devices based on the information acquired by the condition acquiring unit; and
a control unit configured to control the each of the plurality of indoor environment control devices under the operating condition determined by the operating condition determination unit,
wherein the control terminal stores positional information of the control terminal,
wherein the operating condition determination unit calculates a distance between the control terminal and the mobile communication device based on the location information of the mobile communication device and the positional information of the control terminal,
when the distance is equal to or smaller than a given distance set in advance, the operating condition determination unit operates the each of the plurality of indoor environment control devices,
wherein the operating condition determination unit acquires current location information of the mobile communication device after operation of the indoor environment control devices is started, and stops the indoor environment control devices that are being operated when movement of the mobile communication device stops or the mobile communication device is leaving away from the control terminal, wherein the plurality of indoor environment control devices include a hooded ventilator and an air-conditioning system, wherein the operating condition determination unit acquires a target indoor temperature that is a target temperature in the indoor space, and wherein the operating condition determination unit controls the hooded ventilator so that a temperature in the indoor space becomes the target indoor temperature, and controls the air-conditioning system when the temperature in the indoor space does not reach the indoor target temperature with the hooded ventilator.

2. The equipment management system of claim 1,
wherein the operating condition determination unit
acquires the location information of the mobile communication device through the external communication unit more than once,
calculates distances between the control terminal and the mobile communication device based on the location information of the mobile communication device and positional information of the control terminal, and
when a distance calculated based on a latest location information becomes equal to or smaller than the given distance set in advance and at the same time the mobile communication device is approaching the control terminal, controls the indoor environment control devices through the control unit.

3. The equipment management system of claim 1,
wherein the condition acquiring unit acquires a target indoor temperature that is a target temperature in the indoor space, and
wherein the operating condition determination unit
acquires the target indoor temperature through the condition acquiring unit,
acquires location information items of the mobile communication device through the external communication unit more than once at different time points,
calculates a distance between the control terminal and the mobile communication device based on current location information of the mobile communication device and positional information of the control terminal,
calculates a moving speed of the mobile communication device based on the location information items of the mobile communication devices,
calculates an expected arrival time based on the calculated distance and the calculated moving speed, the expected arrival time being a time at which the mobile communication device arrives at a location indicated by the positional information, and
determines a control-starting time and the operating condition of the each of the plurality of indoor environment control devices based on the expected arrival time, and
wherein the control unit controls the each of the plurality of indoor environment control devices under the operating condition determined by the operating condition determination unit.

4. The equipment management system of claim 1,
wherein the operating condition determination unit
calculates a distance between the control terminal and the mobile communication device and a direction of the mobile communication device from the control terminal, based on current location information of the mobile communication device and positional information of the control terminal, the current location information being acquired through the external communication unit, and
predicts expected arrival time at which the mobile communication device arrives at a location of the control terminal, based on the direction and a history of time for the mobile communication device to travel to the location of the control terminal in a previous direction of the mobile communication device from the control terminal, and
determines an on time of the indoor environment control devices based on the expected time predicted, and
wherein the control unit operates the indoor environment control devices under the operating condition determined by the operating condition determination unit.

5. The equipment management system of claim 3,
wherein the condition acquiring unit further acquires an outdoor space temperature that is a temperature in an outdoor space, and changes the given distance set in advance, based on a difference between the target indoor temperature and the outdoor space temperature.

6. The equipment management system of claim 5, wherein the condition acquiring unit increases the given distance when a difference between the target indoor temperature and the outdoor space temperature is greater than a threshold.

7. The equipment management system of claim 5, wherein the condition acquiring unit decreases the given distance when a difference between the target indoor temperature and the outdoor space temperature is less than a threshold.

8. The equipment management system of claim 1, further comprising the mobile communication device configured to acquire the location information of the mobile communication device and communicate with the control terminal connected to the public line,
wherein the mobile communication device
acquires the positional information from the control terminal through the public line, and
calculates a distance between the control terminal and the mobile communication device based on the positional information and the location information of the mobile communication device, and
sends an operation instruction to operate the each of the plurality of indoor environment control devices, to the operating condition determination unit constituting the control terminal when the distance becomes equal to or smaller than a given distance, and
wherein the operating condition determination unit operates the each of the plurality of indoor environment control devices through the control unit responding to the operation instruction from the mobile communication device.

9. The equipment management system of claim 8,
wherein the mobile communication device
calculates a distance to the control terminal more than once at different time points, and
sends the operation instruction when the distance becomes equal to or smaller than a given distance and at the same time the mobile communication device is approaching the control terminal, and operates the each of the plurality of indoor environment control devices through the control terminal.

10. The equipment management system of claim 9, wherein the mobile communication device
acquires current location information of the mobile communication device after operation of the indoor environment control devices is started, and
sends a stop instruction when movement of the mobile communication device stops or the mobile communication device is away from the control terminal, and stops the indoor environment control devices in operation through the control terminal.

11. The equipment management system of claim 1, wherein the mobile communication device is a mobile phone, a car navigation system, or a GPS transmitter.

12. An equipment management system comprising:
an indoor environment control device for controlling an air environment in an indoor space;
a control terminal configured to control the indoor environment control device; and
a mobile communication device connected to the control terminal via a public line,
wherein the mobile communication device is configured to:
acquire positional information of the control terminal stored in the control terminal,
acquire location information of the mobile communication device,
calculate distances, based on the location information of the mobile communication device and the positional information of the control device, between the control device and the mobile communication device more than once,
calculate a moving speed of the mobile communication device based on the location information,
calculate an expected arrival time of the mobile communication device to the indoor space based on the distances and the moving speed,
determine a control-starting time and an operating condition of the indoor environment control device based on the expected arrival time, and
cause the control terminal to start controlling the indoor environmental control device according to the control-starting time and the operating condition,
when at least one of the distances is equal to or smaller than a given distance set in advance, the mobile communication device causes the control terminal to start controlling the indoor environmental control device,
wherein the mobile communication device acquires current location information of the mobile communication device after the control terminal starts controlling the indoor environmental control device, and the mobile communication device causes the control terminal to stop controlling the indoor environmental control device once started when movement of the mobile communication device stops or the mobile communication device is leaving away from the control terminal,
wherein the indoor environment control device includes a hooded ventilator and an air-conditioning system,
wherein the mobile communication device acquires a target indoor temperature that is a target temperature in the indoor space, and
wherein the mobile communication device causes the control terminal to control the hooded ventilator so that a temperature in the indoor space becomes the target indoor temperature, and
control the air-conditioning system when the temperature in the indoor space does not reach the indoor target temperature with the hooded ventilator.

13. The equipment management system of claim 12, wherein the control-starting time and operating condition are determined based on a difference between a target indoor temperature and an outdoor temperature, number of environment control device and type thereof.

14. The equipment management system of claim 12, wherein the mobile communication device is configured to:
store past arrival time data of the mobile communication device to the indoor space,
calculate the expected arrival time of the mobile communication device to the indoor space based on the distances, the moving speed and stored past arrival time data.

15. The equipment management system of claim 12, wherein the mobile communication device changes, after the control-starting time, the operating condition when movement of the mobile communication device stops or the mobile communication device is leaving away from the indoor space.

16. The equipment management system of claim 12, wherein the operating condition is changed by a user of the mobile communication device after the control-starting time.

17. The equipment management system of claim 12, wherein the mobile communication device is a mobile phone, a car navigation system, or a GPS transmitter.

* * * * *